(12) United States Patent
Smith et al.

(10) Patent No.: US 10,187,389 B2
(45) Date of Patent: *Jan. 22, 2019

(54) TECHNOLOGIES FOR SUPPORTING MULTIPLE DIGITAL RIGHTS MANAGEMENT PROTOCOLS ON A CLIENT DEVICE

(71) Applicant: INTEL CORPORATION, Santa Clara, CA (US)

(72) Inventors: Ned M. Smith, Beaverton, OR (US); Nathan Heldt-Sheller, Portland, OR (US); Reshma Lal, Hillsboro, OR (US); Micah J. Sheller, Hillsboro, OR (US); Matthew E. Hoekstra, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,125

(22) Filed: Jul. 18, 2017

(65) Prior Publication Data

US 2017/0318016 A1   Nov. 2, 2017

Related U.S. Application Data

(63) Continuation of application No. 14/360,161, filed as application No. PCT/US2013/076525 on Dec. 19, 2013, now Pat. No. 9,781,113.

(51) Int. Cl.
*H04L 29/06* (2006.01)
*G06F 21/10* (2013.01)

(52) U.S. Cl.
CPC ............ *H04L 63/10* (2013.01); *G06F 21/10* (2013.01); *H04L 67/42* (2013.01); *G06F 2221/0708* (2013.01)

(58) Field of Classification Search
CPC ......... H04L 63/10; H04L 67/42; G06F 21/10; G06F 2221/0708
See application file for complete search history.

(56) References Cited

U.S. PATENT DOCUMENTS 8,028,339 B2   9/2011   Han
8,387,154 B2   2/2013   Pestoni
(Continued)

FOREIGN PATENT DOCUMENTS

CN         102473224 A     5/2012
KR    10-2005-0001701 A    1/2005
(Continued)

OTHER PUBLICATIONS

Korean Office Action issued in Korean Application No. 2016-7019179, dated Oct. 23, 2017, with English translation, 11 pages.
(Continued)

*Primary Examiner* — Joseph P Hirl
*Assistant Examiner* — Thomas A Gyorfi
(74) *Attorney, Agent, or Firm* — Grossman, Tucker, Perreault & Pfleger, PLLC

(57) ABSTRACT

Technologies for supporting and implementing multiple digital rights management protocols on a client device are described. In some embodiments, the technologies include a client device having an architectural enclave which may function to identify one of a plurality of digital rights management protocols for protecting digital information to be received from a content provider or a sensor. The architectural enclave select a preexisting secure information processing environment (SIPE) to process said digital information, if a preexisting SIPE supporting the DRM protocol is present on the client. If a preexisting SIPE supporting the DRM protocol is not present on the client, the architectural enclave may general a new SIPE that supports the DRM
(Continued)

protocol on the client. Transmission of the digital information may then be directed to the selected preexisting SIPE or the new SIPE, as appropriate.

20 Claims, 4 Drawing Sheets

(56) References Cited

U.S. PATENT DOCUMENTS

| | | |
|---|---|---|
| 9,223,988 B1 | 12/2015 | Darwin |
| 2004/0133632 A1 | 7/2004 | Messerges et al. |
| 2005/0022033 A1 | 1/2005 | Han |
| 2008/0021836 A1 | 1/2008 | Lao |
| 2009/0125987 A1 | 5/2009 | Irwin |
| 2009/0210923 A1 | 8/2009 | Jogand-Coulomb |
| 2010/0257539 A1 | 10/2010 | Narayanan et al. |
| 2010/0313209 A1 | 12/2010 | Ryu et al. |
| 2012/0011571 A1 | 1/2012 | Moroney et al. |
| 2012/0017282 A1 | 1/2012 | Kang et al. |
| 2012/0110337 A1 | 5/2012 | Murphey et al. |
| 2012/0163589 A1 | 6/2012 | Johnson et al. |
| 2013/0091214 A1 | 4/2013 | Kellerman et al. |
| 2014/0095890 A1 | 4/2014 | Mangalore et al. |
| 2015/0304736 A1 | 10/2015 | Lal et al. |

FOREIGN PATENT DOCUMENTS

| | | |
|---|---|---|
| KR | 10-2010-0125246 A | 11/2010 |
| WO | 2014-196966 A1 | 12/2014 |

OTHER PUBLICATIONS

Chinese Office Action issued in Chinese Application No. 201380081047.9, dated Jan. 29, 2018, with English machine translation, 16 pages.

International Search Report and Written Opinion from application PCT/US2013/076525, dated Sep. 26, 2014, 14 pages.

International Preliminary Report on Patentability and Written Opinion, issued in corresponding PCT Application No. PCT/US2013/076525, dated Jun. 30, 2016, 8 pages.

Extended European Search Report issued in European Application No. 13899881.0, dated Jul. 26, 2017, 7 pages.

Roemelle, Brian. "What Is Apple's New Secure Enclave and Why Is It Important?" Published Sep. 18, 2013, 6 pages. http://www.forbes.com/sites/quora/2013/09/18/what-is-apples-new-secure-enclave-and-why-is-it-important/print/.

Rutkowska, Joanna. "Thoughts on Intel's upcoming Software Guard Extensions (Part 1)" Published Aug. 30, 2013, 10 pages. http://theinvisiblethings.blogspot.com/2013/08/thoughts-on-intels-upcoming-software.html.

Rutkowska, Joanna. "Thoughts on Intel's upcoming Software Guard Extensions (Part 2)" Published Sep. 23, 2013, 8 pages. http://theinvisiblethings.blogspot.com/2013/09/thoughts-on-intels-upcoming-software.html.

Office Action issued in U.S. Appl. No. 14/360,161, dated Aug. 26, 2016, 10 pages.

Notice of Allowance issued in U.S. Appl. No. 14/360,161, dated Apr. 20, 2017, 8 pages.

TECHNOLOGIES FOR SUPPORTING MULTIPLE DIGITAL RIGHTS MANAGEMENT PROTOCOLS ON A CLIENT DEVICE

CROSS-REFERENCE TO RELATED APPLICATION

The present application is a continuation of U.S. patent application Ser. No. 14/360,161 filed May 22, 2014, which is a national stage of PCT Application No. PCT/US2013/076525, filed Dec. 19, 2013, the entire disclosures of which are incorporated herein by reference.

TECHNICAL FIELD

The present disclosure generally relates to technologies for supporting multiple digital rights management protocols on a client device. More particularly, the present disclosure relates to technologies for supporting multiple digital rights management protocols with a single client device using one or more secure processing environments.

BACKGROUND

Consumers and content developers are becoming increasingly interested in producing and receiving content (e.g., audio, video, software, etc.) in digital form. Technologies for producing and distributing digital information in large quantities and across long distances have therefore been developed. Such technologies have enabled content providers to reach unprecedented numbers of consumers in a cost effective manner and, in turn, have provided consumers with unprecedented access to large amounts of digital information.

Because digital information may be easily copied and distributed, digital rights management (DRM) protocols have been developed to protect digital information as it is transmitted to, stored on, and consumed by an electronic device. In many instances a DRM protocol may protect digital information by encrypting it with an encryption key prior to transmission to an electronic device. Consumers wishing to access the digital information may only conveniently do so if their device possesses an appropriate decryption key. Although such DRM protocols can be effective, many consumer devices maintain DRM decryption keys in unsecured memory. This may allow a hacker or other entity to easily obtain the decryption key(s), bypass the DRM protocol, and gain unauthorized access to the digital information.

To further harden the security of digital information, some content providers employ hardware (HW) DRM protocols to protect their digital information. A HW DRM protocol may require devices that are to consume digital information produced by a content provider to include a hardware DRM module. The content provider may require the hardware DRM module to be specifically configured to include hardware and/or software resources that support a defined set of DRM protocols, which may also be specified the content provider. Although effective, the usefulness of a hardware DRM protocol is limited by the fact that a hardware DRM module has limited resources which are specifically designed to support specific DRM protocols.

Indeed because of its design and/or limited resources, it may be difficult or impossible for a hardware DRM module to execute DRM protocols other than those it was specifically designed to support. This presents a usability issue, particularly when DRM protocols change and/or multiple content providers wish to use different DRM protocols to protect their content. This can also present a usability issue with respect to the protection of content that may be created by a client device, where different DRM protocols may be preferred by different users and/or required to protect content produced from different sources.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DETAILED DESCRIPTION

Figure 1:
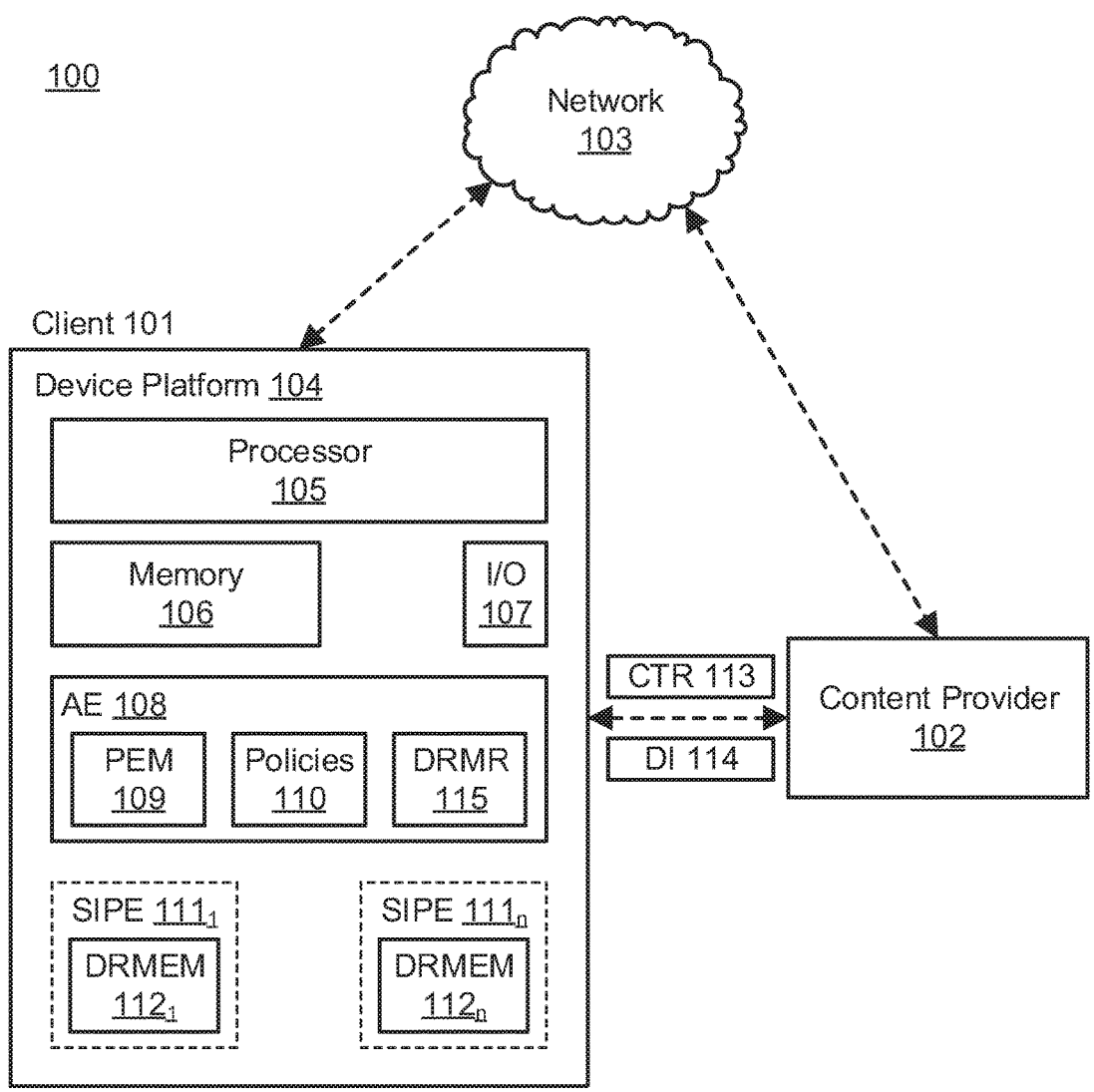
FIG. 1 illustrates an exemplary system for supporting multiple digital rights management protocols including a client device consistent with the present disclosure.

While the present disclosure is described herein with reference to illustrative embodiments for particular applications, it should be understood that such embodiments are exemplary only and that the invention as defined by the appended claims is not limited thereto. Indeed for the sake of illustration the technologies described herein may be discussed in the context of one or more use models in which specific digital rights management (DRM) protocols are employed to protect digital information. Such discussions are exemplary only, and it should be understood that all or a portion of the technologies described herein may be used in other contexts and with other DRM protocols. Those skilled in the relevant art(s) with access to the teachings provided herein will recognize additional modifications, applications, and embodiments within the scope of this disclosure, and additional fields in which embodiments of the present disclosure would be of utility.

The terms "client" and "client device" are interchangeably used herein to refer individually or collectively to any of the large number of electronic devices that may be used to support multiple DRM protocols with one or more secure processing environments. In this regard, any kind of mobile or stationary device may be used as a client device, provided it is capable of hosting one or more secure processing environments and resources that may be needed to support a plurality of DRM protocols, as will be discussed in detail below.

Non-limiting examples of suitable client devices include cameras, cell phones, computer terminals, desktop computers, electronic readers, facsimile machines, kiosks, netbook computers, notebook computers, internet devices, payment terminals, personal digital assistants, media players and/or recorders, servers, set-top boxes, smart phones, tablet personal computers, televisions, ultra-mobile personal computers, wired telephones, combinations thereof, and the like. Such devices may be portable or stationary. Without limitation, the client's described herein are preferably in the form of a cellular phone, desktop computer, electronic reader, laptop computer, set-top box, smart phone, tablet personal computer, television, or ultra-mobile personal computer.

The term "digital information" is used herein to refer to content such as audio, video, imagery, text, markup, pictures, metadata, hyperlinks, source code, digital rights management (DRM) software, other software, licenses, encryption and/or decryption keys, authentication credentials, digital signature keys, access policies, other data (e.g. sensor data), combinations thereof, and the like, which may be stored in digital form in a computer readable medium.

The term "content provider" is used herein to refer to a device or other entity that produces and/or transfers digital information to a client. In some embodiments, a content provider may be in the form of an electronic device or storage medium that transfers digital information to a client. For example, a content provider may be a third party device, a storage medium such as a magnetic recording medium, a flash (e.g., NAND or NOR) memory device, a thumb drive, an optical disc, etc., combinations thereof, and the like. Alternatively or additionally, a content provider may be in the form of one or more servers, which may transmit or otherwise provide digital information protected by one or more DRM protocols to a client in any suitable manner, such as via wired or wireless transmission. Similarly, a content provider may be one or more sensors coupled to or otherwise in communication with a client device.

For the sake of clarity and ease of understanding, many of the FIGS illustrate systems in which a single content provider provides digital information to a client. Such illustrations are exemplary and any number of content providers may be used. Indeed, the technologies described herein may be implemented with a plurality (e.g., 2, 5, 10, 20, 50, 100 or more) content providers, any or all of which may employ different DRM protocols to protect its respective digital information. Thus, while the present disclosure may refer to a content provider in the singular, such expressions should be interpreted as also encompassing the plural form.

As used in any embodiment herein, the term "module" may refer to software, firmware and/or circuitry that are configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may, collectively or individually, be embodied as circuitry that forms a part of one or more client devices.

As briefly described in the background, content providers often protect their digital information with one or more digital rights management (DRM) protocols. As the suite of available DRM protocols increases and such protocols are updated over time, it is becoming increasingly difficult to support those protocols with hardware DRM models that employ one or more hardware DRM modules. Indeed because hardware DRM modules generally have fixed resources, their host clients often cannot be adapted to implement new/updated DRM protocols without making a change to the hardware DRM module itself.

Some content providers may choose to protect their digital information with a DRM protocol that does not employ a hardware DRM module. Although such DRM protocols may not suffer from the drawbacks associated with the use of a hardware DRM module such as those noted above, they may have other disadvantages. For example, such DRM protocols may rely on the provisioning of secrets (e.g., decryption keys, licenses, access policies, etc. to a client device, which the client may store in unprotected memory. As a result, it may be relatively easy for a hacker or other entity to attack the client and gain access to the secrets stored thereon. The hacker/entity may then use those secrets to access the digital information, effectively bypassing the DRM protocol that was used to protect that information.

With the foregoing in mind, the present disclosure generally relates to technologies (e.g., devices, systems, methods, computer readable media, etc.) for supporting and/or implementing multiple different DRM protocols on a client device. As will be described in detail later, the technologies of the present disclosure generally utilize client devices that include one or more secure processing environments. These environments may function in part to harden the security of digital information on a client device, e.g., by protecting the plaintext of the digital information as well as assets that may be utilized in a DRM protocol to be implemented in the secure processing environment. And because such environments may be flexibly configured (e.g., with partitioned assets of their host client device or even a third party device), they may be used to support a wide variety of DRM protocols, even without a hardware update to the client device.

More particularly, the secure processing environments may provide a secure location for the storage and/or execution of assets that may be used in the implementation of one or more DRM protocols. For example, such environment(s) may provide a secure location for the storage, execution, and use of the plaintext of digital information, the plaintext of information encryption keys used to encrypt digital information, authentication credentials, policies governing access to digital information, various modules for digital rights management and policy enforcement, combinations thereof, and the like. Due to the nature of the environments, the assets maintained therein may be protected from unauthorized access by third parties.

Memory enclaves are one example of a secure processing environment that may be used in the client devices of the present disclosure. A memory enclave is made up of at least one memory page that has a different access policy than the access policy imposed by traditional ring boundaries of a computing device. The memory page(s) within a memory enclave may have associated read/write controls which may be configured such that the read/write controls have exclusivity over certain operating modes or privilege "rings", system management mode or virtual machine monitors of an associated processor. A memory enclave may therefore be designed to provide a sheltered place to host and execute trusted code, data, and the like such that it may be protected from other software on a client, including application software and privileged software such as an operating system, a virtual machine monitor, combinations thereof, and the like. It should be understood that the terms "memory enclave" and "secure enclave" are used interchangeably in the context of the present disclosure. Without limitation, suitable memory enclaves include those provided using INTEL™ secure enclave technology, which may be implemented using Intel secure guard instructions (SgX) or in another manner. Of course, other suitable memory enclave technologies may be used.

Reference is now made to FIG. 1, which depicts one example of a system for supporting multiple digital rights management protocols with a client device consistent with the present disclosure. As shown, system 100 includes client device 101 (client 101), content provider 102 and optional network 103. FIG. 1 may therefore be understood to depict a use case in which a content provider (e.g., a third party) is to provide digital information to a client device for consumption. Accordingly in FIG. 1, a user may wish to consume digital information received from content provider 102 on client 101. Client 101 and content provider 102 may therefore be in wired or wireless communication, such that content provider 102 may transmit digital information to client 101 using one or more predetermined wired or wireless communication protocols.

This concept is shown in FIG. 1, which depicts content provider 102 transmitting digital information 114 (DI 114) to client 101 directly, e.g., via a close range communication technique such as near field communication, a BLUETOOTH® connection, a ZigBee network, combinations thereof, and the like. Of course, communication of DI 114 to client 101 need not occur via a close range communication technique. Indeed, the present disclosure envisions systems wherein content provider 102 transmits DI 114 to client 101 via a relatively long range communication technique, such as via network 103. In this regard, network 103 may be understood as correlating to one or more of a wide area network (e.g., the internal, an enterprise network, a wireless communications network (e.g., a WiFi network, a cellular network, etc.), combinations thereof, and the like. Content provider 102 may be prompted to transmit DI 114 to client 101, e.g., in response to a content request message received from client 101. Transmission of the content request message may be instigated by a user (e.g., via a user interface) and/or an application executed on client 101.

Client 101 includes device platform 104, which may be any suitable device platform. Without limitation, it is preferred that device platform 104 correlate to the type of device used as client 101. Thus for example, where client 101 is a cellular phone, smart phone, desktop computer, laptop computer, etc., device platform 104 is preferably a cellular phone platform, smart phone platform, desktop computer platform, laptop computer platform, etc. respectively.

Regardless of its nature, device platform 104 may include processor 105, memory 106, and input/output resources 107 (I/O 107). Processor 105 may be any suitable general purpose processor or application specific integrated circuit, and may be capable of executing one or multiple threads on one or multiple processor cores. Without limitation, processor 105 is preferably a general purpose processor, such as but not limited to the general purpose processors commercially available from INTEL® Corp., ADVANCED MICRO DEVICES®, ARM®, NVIDIA®, APPLE®, and SAMSUNG®. While FIG. 1 illustrates client 101 as including a single processor, multiple processors may be used. Without limitation, processor 105 is preferably a past, present or future produced single or multicore INTEL® processor.

Memory 106 may be any suitable type of computer readable memory. Exemplary memory types that may be used as memory 106 include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, memory 106 may include other and/or later-developed types of computer-readable memory.

I/O 107 may include hardware (i.e., circuitry), software, or a combination of hardware and software that is configured to allow client 101 to transmit and receive communications to and from content provider 102. Communication between I/O 107 and content provider 102 may occur over a wired or wireless connection using a close and/or long range communications network as described generally above. I/O 107 may therefore include hardware to support such communication, e.g., one or more transponders, antennas, BLUETOOTH™ chips, personal area network chips, near field communication chips, network interface cards, combinations thereof, and the like.

As noted above, content providers such as content provider 102 may be in the form of one or more data storage mediums. In such instances I/O 107 may be configured to receive information (e.g., digital information, license policies, keys, resource requirements, etc.) from a data storage medium such as a magnetic recording medium, optical recording medium, magneto-optical recording medium, a solid state (FLASH) recording medium, combinations thereof, and the like. I/O 107 may of course be configured to receive digital information from diverse content sources, including a combination of recording media and a computing system such as a server, which may be local to or remote from client 101.

The client devices described herein may also include a plurality of secure processing environments, such as one or more DRM architectural enclaves and secure information processing environments (SIPEs). For the sake of brevity, DRM architectural enclaves are often referred to in this disclosure simply as an "architectural enclave" or "AE". This concept is illustrated in FIG. 1, which depicts client 101 as including DRM architectural enclave (AE) 108 and secure information processing environments (SIPEs) $111_1$ and $111_n$. It is noted that SIPEs $111_1$ and $111_n$ are illustrated with hashing to emphasize that they may or may not be pre-provisioned on client 101, e.g., at the time a content transmission request (e.g., CTR 113) is received from content provider 102, or some other source of digital information. For clarity, SIPEs that are present on client 101 prior to the receipt of a CTR are referred to herein as a "preexisting SIPE." In contrast, an SIPE that is generated or "spawned" by architectural enclave 108 e.g., in response to receipt of a CTR are referred to herein as a "new SIPE."

In general architectural enclave (AE) 108 is a secure processing environment (such as a memory enclave) which may include policy enforcement module 109 (PEM 109). PEM 109 may be executed within architectural enclave 108 (e.g., with processing resources allocated thereto), and may function in part to determine which of a plurality of DRM protocols is to be implemented with respect to a particular piece of digital information, such as DI 114. PEM 109 may make this determination by leveraging information contained in one or more policies 110 stored in architectural enclave 108. Policies 110 may include, among other things, a DRM selection policy (not separately illustrated).

In general, a DRM selection policy may be a database or other data structure which associates one or a combination of DRM selection factors with one or more DRM protocols.

Non-limiting examples of DRM selection factors that may be used include categorical factors such as the department with which a user of the client device is associated, such as human resources, executive office, etc., the type of device/sensor that produced the digital information, etc. as well as an assigned compartmentalization of the digital information in question. For example, where digital information may correspond to global positioning information, a categorization assigned to that information may be a geographic region, such as "North America."

Other examples of DRM factors include the type of digital information in question such as audio, video, code, etc., level factors such as the security level of the digital information in question, user security level, client device security level, security level of the environment in which a sensor that generated the digital information is located, etc., contextual factors such as the identity of the content provider, time of day, type and/or identity of the network/sensor from which the digital information will be received, client device location, user presence, user identity, combinations thereof, and the like. Further examples of DRM factors include content tags, which may be applied to digital information by a content provider, a sensor producing the digital information, or another entity. Such tags may for example describe various attributes of the digital information, such as whether the digital information contains explicit images/language, carries a particular parental guidance rating, etc. Various combinations of DRM selection factors may be cross referenced with one or more DRM policies, as noted above.

In operation client 101 may receive (e.g., with I/O 107) a content transmission request (CTR) 113 from content provider 102. Among other things, CTR 113 may include information regarding the category, type, level etc. of DI 114 and/or content provider 102, as well as contextual information relevant to DI 114 and/or content provider 102 (e.g., the identity of content provider 102, the author of DI 114, the time of day, the location of transmission, etc.). While the present disclosure envisions embodiments wherein the CTR is provided as a separate message to client 101, the CTR may take other forms. For example, a CTR may take the form of header information accompanying one or more packets associated with a stream of digital information from content provider 102. Alternatively or additionally, a CTR may take the form of metadata appended to or otherwise associated with a transmission of digital information from content provider 102.

In response to the CTR, PEM 109 may compare information in CTR 113 to the DRM factors in the DRM selection policy, e.g., maintained in policies 110. Alternatively or additionally, PEM 109 may query sensors (not separately illustrated) and/or other resources (e.g., one or more classifiers, also not illustrated) of client 101 for information that it may use to identify the DRM protocol that is to be implemented to protect DI 114, such as contextual information relevant to client 101, a user thereof, software thereon, etc. For example, client 101 may include one or more sensors which may be used to verify user presence, user identity, client device location, user location, etc. Non-limiting examples of such sensors include accelerometers, gyro meters, magnetometers, pressure sensors, temperature sensors, ambient light sensors, infrared proximity sensors, wireless devices (BLUETOOTH®, near field communication, Wi-Fi, global positioning sensors, cameras, microphones, touch screens, biometric readers, combinations thereof, and the like.

Such sensors may feed raw data into one or more classifiers which may function to classify the raw data in accordance with the DRM factors noted above, e.g., to verify user presence. Such classifiers may be integral to the sensor, integral to client 1010, or maintained in a separate device. In such instances, PEM 109 may query such sensors/classifiers to verify user presence, user identity, or some other contextual factor(s) relevant to determining which DRM protocol is to be implemented.

In any case, PEM 109 when executed may compare the information gleaned from CTR 113 and optionally from client 101 to the DRM selection factors in the DRM selection policy. Based on this comparison (which may involve, for example cross referencing information in CTR 113 and/or gleaned from client 101 against the DRM factors in the DRM selection policy), PEM 109 may determine which of the plurality of DRM protocols identified in the DRM selection policy is to be implemented to protect digital information 114.

Alternatively or additionally, CTR 113 or another message may specify which DRM protocol is to be implemented to protect digital information 114. In such instances, the DRM protocol specification in CTR 113 or another message may be understood to override the DRM selection operations of PEM 109. Alternatively, the DRM protocol specification may be applied by PEM 109 to weight its determination of which DRM protocol is to be implemented. In any case, it should be understood that content provider 102 may use CTR to specify which DRM policy is to be implemented to protect DI 114. In such instances PEM 109 may verify that it has knowledge of the procedural requirements of the specified DRM policy, and that client 101 is in possession of the resources (hardware, software and/or otherwise) needed to implement the specified DRM policy. If not, PEM 109 may cause architectural enclave to send query content provider 102 and/or another party (e.g., a trusted third part, not shown) to provide a description of the procedural requirements (if necessary) and/or to provide any missing (non-hardware) resources that may be needed to implement the specified DRM policy. PEM 109 may then cause the architectural enclave to update its DRM selection database and a digital rights management (DRM) repository, which is described below.

Architectural enclave 108 may also include DRM repository 115, which may be included in the DRM selection policy (i.e. within policies 110) or stored separately within the architectural enclave. In general, DRM repository 115 may be a database or other data structure which associates each of the DRM protocols identified in the DRM selection policy with resource requirements (specific resource allocation, specific memory requirements, other hardware requirements, keys, attestation information, etc.) that may be needed to implement such protocols in a secure processing environment, such as the secure information processing environments discussed later. For example, DRM repository 115 may store one or more encryption keys, access policies, licenses, etc. in association with any or all of the DRM protocols identified therein. Furthermore DRM repository 115 may identify attributes of a secure processing environment (e.g., type of client device hosting the secure processing environment, the classification level of the secure processing environment, etc.) that may be needed to implement a particular DRM protocol.

Of course, the type and nature of these resource requirements and attributes may differ between DRM protocols. As may be appreciated, DRM repository 115 may be updated as new DRM protocols that may be supported by the client device are added, existing DRM protocols supported by the client device are modified (e.g., updated), and/or existing DRM protocols supported by the client device are removed. Similarly, DRM repository may be updated as resources (e.g., keys, DRM software, etc.) needed to support a particular DRM protocol change.

Having determined which DRM protocol is to be implemented to protect DI 114, PEM 109 when executed within the architectural enclave may examine the information in DRM repository 115 to determine the resource requirements and/or attributes needed to implement the identified DRM protocol in a secure processing environment. PEM 109 may then cause architectural enclave 108 to determine whether a secure information processing environment (SIPE) meeting those requirements is present on the client device. That determination may be performed pursuant to the execution of PEM 109 itself or by another module, such as an SIPE determination module also executed within architectural enclave 108 (not separately illustrated).

An SIPE is as a secure processing environment (e.g., a memory enclave) which is configured with resources (e.g., processing, memory, keys, etc.) needed to implement one or more DRM protocols. Because such resources are maintained in an SIPE, it may be difficult or impossible for a hacker or other third party to gain access to those resources in an effort to bypass the relevant DRM protocol. In this way, an SIPE is similar to a hardware DRM module. Because an SIPE is implemented as secure processing environment (e.g., a memory enclave), however, it may not suffer from the drawbacks associated with the limited resources in a hardware DRM module. Indeed, an SIPE may be flexibly provisioned with resources, which may include all or a portion of the processing, memory, and other resources of client 101. Moreover, SIPEs may be assigned and/or configured to meet various attribute requirements that may be imposed by a DRM protocol, such as a particular security level, digital information type, employee type, etc. Thus, use of SIPEs can provide great flexibility in how DRM protocols may be implemented on a client device.

It should therefore be understood that a single client device may be configured with one or multiple different SIPE's wherein each SIPE is allocated the same or different resources and/or attributes. By appropriately allocating resources and attributes, an SIPE may be configured to support one or more DRM protocols. By way of example, a client device may be configured to include a first SIPE which is configured (e.g., allocated hardware, attributes and/or other resources) to support a first DRM protocol, as well as a second SIPE which is configured (e.g., allocated hardware, attributes and/or other resources) to support a second, different DRM protocol. As noted previously, the first and second DRM protocols may have different resource and/or attribute requirements, and thus it may be understood that the first and second SIPEs may be configured differently to support the particular requirements of the first and second DRM protocols.

This concept is shown in FIG. 1, which depicts client 101 as including SIPE $111_1$ and SIPE $111_n$. For the sake of clarity, FIG. 1 depicts client 101 as only hosting two SIPEs, but it should be understood that any number of SIPEs may be hosted on a client device. With this in mind, subscript n in FIG. 2 may be 0 or an integer greater than or equal to 2, thus illustrating that client 101 may include one, two, or more SIPEs. In some embodiments, the number of SIPEs that may be hosted by a client may correlate to the number of DRM protocols that client 101 is to support. In such instances it may be understood that each SIPE is configured to implement one of the DRM protocols that client 101 is to support.

The hardware and other resources needed to implement the first DRM protocol may differ from those needed to implement the second DRM protocol. For example, a first DRM protocol to be implemented using SIPE $111_1$ may specify the use of particular decryption keys, particular DRM software, memory (e.g., buffer) resources, input output resources, etc., as well as a particular clearance level (e.g., top secret). In contrast, another (e.g., second) DRM protocol to be implemented using SIPE $111_n$ may require the use of other resources, as well as a different clearance level (e.g. unclassified). SIPE $111_1$ and SIPE $111_n$ may be allocated these resources, e.g., by architectural enclave 108 or another entity that can provision a secure processing environment on client 101. In sum, client 101 may be provisioned with a plurality of secure information processing environments, each of which may be allocated resources needed to support one or more DRM protocols.

Various mechanisms for allocating/provisioning a secure processing environment with resources are known, and thus are not described in detail herein. By way of example, resources such as hardware, software, digital information, various keys (e.g., enclave sealing keys, encryption keys, decryption keys, secure session keys, etc.) and the like may be provisioned utilizing the processes described in International Patent Application No. PCT/US13/44158 filed Jun. 4, 2013. Therefore in some embodiments, architectural enclave 108 may exchange one or more keys over a secure control channel, wherein the key(s) may be used to protect (via encryption) the communication of non-hardware resources to an SIPE.

Using those or other methods, an architectural enclave or another entity may provision an SIPE with the hardware and other resources that may be required by a plurality of DRM protocols, including but not limited to any current or future version of WIDEVINE® DRM, Marlin DRM, Open Mobile Alliance (OMA) DRM, MICROSOFT® PLAYREADY®, advanced access content system (AACS) protocol, Windows Media DRM, high definition content protection, protected audio video path, digital transmission content protection (DTCP), digital transmission content protection mapped to internet protocol (DTCP-IP), combinations thereof, and the like. The aforementioned DRM protocols are of course exemplary, and any suitable DRM protocol may be implemented in an SIPE on a client device, provided the SIPE may be provisioned with the appropriate resources.

As implied by the forgoing discussion, one general function of an SIPE is to execute various operations in accordance with a DRM protocol (hereinafter, DRM operations). In this regard, SIPE $111_1$ and SIPE $111_n$ may include DRM enforcement module (DRMEM) $112_1$ and $112_n$, respectively. DRMEMs $112_1$, $112_n$ may be provided by architectural enclave 108, another source (e.g., a trusted third part), and/or a content provider such as content provider 102. In general, a DRMEM when executed may cause an SIPE to execute DRM operations in accordance with a DRM protocol, utilizing the resources that were allocated to the SIPE, e.g., by an architectural enclave or another SIPE provisioning entity. More specifically, a SIPE may utilize the resources allocated to it to process digital information (e.g., DI 114) in accordance with the DRM protocol and/or protocols that the SIPE is configured to support. Thus for example, a SIPE $111_1$ and DRMEM $112_1$ may be configured to process digital information 114 in accordance with a first DRM protocol, whereas a SIPE $111_n$ and DRMEM $112_n$ may be configured to process digital information in accordance with a second, different DRM protocol.

As used herein, the terms "process" and "processing" when used in conjunction with operations performed by an SIPE in associated with digital information refer to operations that the SIPE (or, more specifically a DRMEM executed within an SIPE) may perform pursuant to a DRM protocol that the SIPE is configured to support. Such operations may include, for example, attesting the identity of the SIPE to a content provider, exchanging one or more keys with the content provider (and/or obtaining relevant keys from digital rights management repository 115), decrypting digital information received from content provider 102 (which may be encrypted with a first encryption key) to obtain plaintext, demodulating the plaintext digital information (e.g., where DI 114 includes modulated audio, video and/or other signals), decoding the plaintext to obtain decoded digital information, re-encoding the decoded digital information (e.g., where a DRM protocol requires transcoding to a specific format), encrypting digital information for storage, sealing digital information to an SIPE, combinations thereof, and the like.

In some embodiments a DRM protocol may specify that digital information is to employ displayed using secure media hardware. In such instances, "processing" may further include encrypting digital information for secure output and/or display on media hardware. By way of example, a DRMEM may be configured to encrypt digital information with one or more keys, e.g. as may be used in secure audio video path technology such as INTEL protected audio video path (PAVP) technology. Likewise, an SIPE may be configured to encrypt digital information for secure display, e.g., using one or more keys as may be used in high definition content protection (HDCP) or another secure display protocol.

In one example, a DRM protocol (e.g. PAVP, IEEE 1667 (versions in force prior to and after the filing of this disclosure), etc.) may specify that digital content provided to an SIPE is to be protected before it is output to another device, such as a graphics processing unit (GPU). Such protocol may require partitioning of the GPU resource, which may be performed using an administrative console/utility executed within AE 108. The protocol may further require establishing a secure channel between the GPU and an SIPE using one or more keys. In such instance, a module in architectural enclave 108 may exchange the key(s) need to establish the secure channel with the relevant SIPE. The SIPE may then encrypt the digital content for output to the GPU using the provisioned key(s).

Accordingly, the client devices of the present disclosure employ an architectural enclave that includes a module (e.g., PEM or otherwise), which may determine which of a plurality of DRM protocols is to be implemented to protect digital information. Having identified the DRM protocol that will be used, the architectural enclave may further determine whether a preexisting SIPE on the client device (if any) is configured to support the identified DRM protocol. If not, the architectural enclave may generate or spawn a new SIPE on the client device, and provision that new SIPE with resources that may be needed to perform the identified DRM protocol.

If an architectural enclave and/or the preexisting/new SIPE lack non-hardware resources which may be needed to implement the identified DRM protocol, it may request such resources from a content provider and/or another entity, such as a trusted third party. By way of example, an architectural enclave may include a digital rights management repository that lacks one or more keys used in the implementation of a DRM protocol. As a result, the architectural enclave may not be able to provision a new or preexisting SIPE with the keys needed to support that DRM protocol.

To address this issue, the architectural enclave and/or identified SIPE (or more particularly, a module in such secure environments) may cause its host client to send a message (e.g., a DRM information request message) to a content provider or other party, requesting the needed information (in this case, keys). Once the needed information (keys) is received from the content provider and/or other party, the architectural enclave may update its digital rights management repository with the received information (keys), and may provision the information (keys) to the identified SIPE. Alternatively or additionally, the identified SIPE may receive the needed information directly from the content provider or other source.

Once a preexisting or new SIPE has been identified as being configured to implement an identified DRM protocol, communication of the digital information in question may be directed to the identified SIPE. In this regard and referring again to FIG. 1, architectural enclave 108 may send a message (e.g., an SIPE identification message) that identifies which SIPE (e.g. SIPE $111_1$) content provider 102 is to transmit digital information 114. Alternatively or additionally, the DRM enforcement module of the identified SIPE (e.g., DRMEM $112_1$) when executed may establish communication with content provider 102 using communication resources (e.g., I/O 107) allocated to it. Content provider 102 may then transmit messages containing DI 114 to the identified SIPE, in this case SIPE $111_1$, for processing in accordance with the identified DRM protocol. In instances where secure communication between client 101 and content provider is desired, architectural enclave 108 and/or SIPEs $111_1$, $111_n$ may negotiate a secure communications channel with content provider 102. Negotiation of the secure communications channel may be performed in accordance with any suitable secure communications protocol, such as the transport layer security (TLS) protocol, a sign and message authentication code (SIGMA) protocol, an asymmetric or symmetric encryption protocol, combinations thereof, and the like.

In any case, content provider 102 may transmit DI 114 to client 101 (or, more particularly, to a selected SIPE such as SIPE $111_1$) for processing in accordance with an identified DRM protocol. To protect DI 114 during transmission, content provider may encrypt DI 114 using a first encryption protocol, such as but not limited to a public key encryption protocol, a symmetric key encryption protocol, an asymmetric key encryption protocol, etc. In general, the first encryption protocol may convert the plaintext of the digital information to cipher text using one or more keys. With this in mind, a selected SIPE in client 101 may be provisioned with an appropriate key needed to decrypt the encrypted digital information, so as to obtain its plaintext within a secure processing environment.

Once the plaintext of the digital information is obtained, the selected SIPE may execute DRM operations to process the digital information in a manner consistent with the DRM protocol it is configured to support. As noted previously, such operations may include demodulating the plaintext to obtain demodulated plaintext, re-modulating the demodulated plaintext (e.g., in accordance with a specified output), decoding the plaintext to obtain decoded plaintext, encoding or re-encoding the plaintext (e.g. into a different format), encrypting the plaintext (e.g., with one or more keys that may be used in accordance with a protected audio video protocol such as high definition content protection, INTEL® protected audio video path, etc.), establishing a secure communications link with a downstream device (e.g., using TLS, SIGMA, Internet protocol security (IPSEC), PKSC12 cryptography, other message/channel encryption or key encryption operations, combinations thereof and the like.

Figure 2:
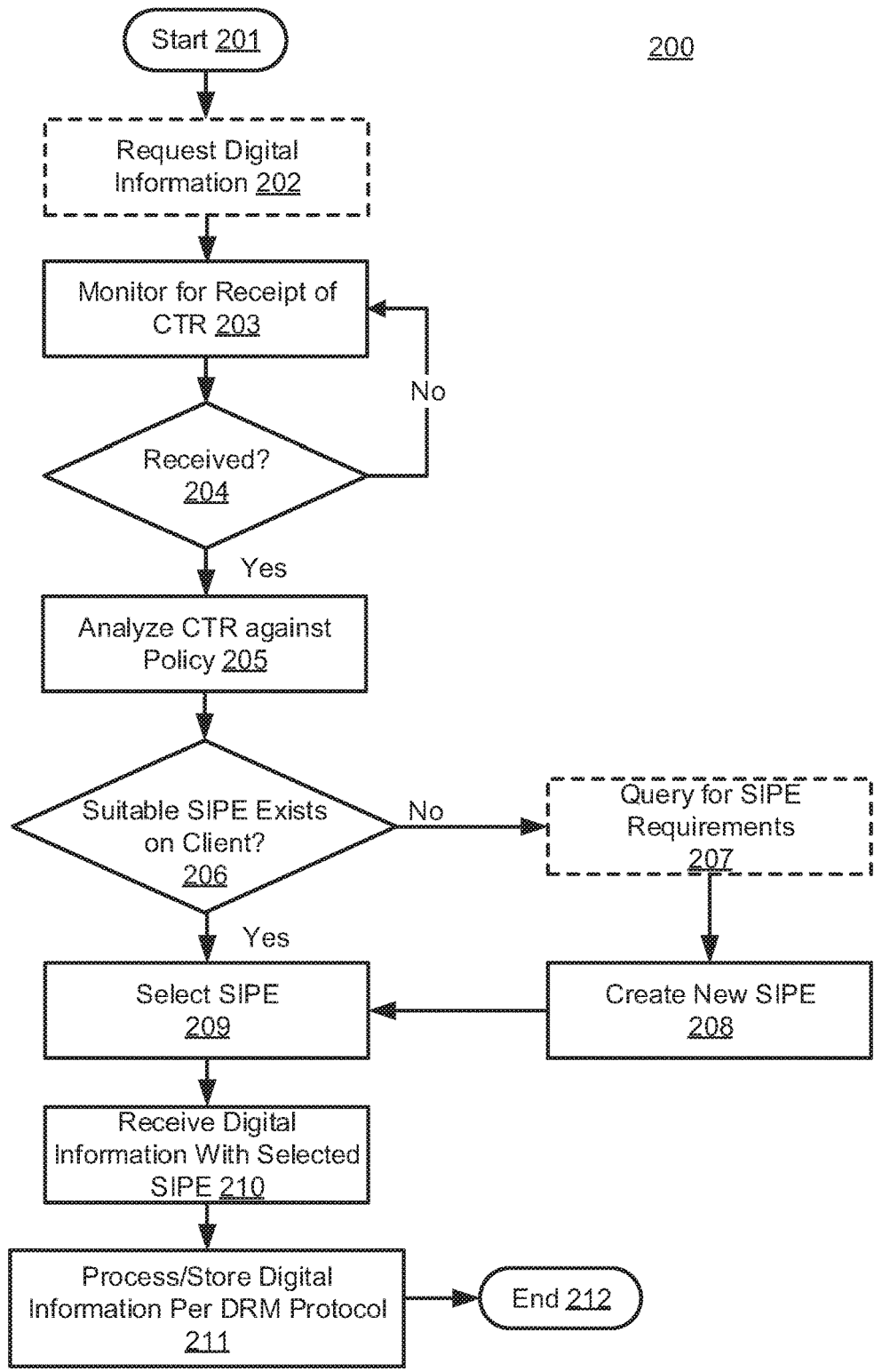
FIG. 2 is a flowchart of exemplary operations consistent with an example method of supporting multiple digital rights management protocols consistent with the present disclosure, in a use case in which a client device receives digital information from a content provider.

Reference is now made to FIG. 2, which is a flow chart of exemplary operations that may be performed in accordance with one example method of supporting multiple digital rights management protocols on a client device, consistent with the present disclosure. As shown, method 200 begins at block 201. The method may then proceed to optional block 202, wherein a client device may optionally request digital information from a content provider. Such a request may be initiated, e.g., via a user interface or another mechanism as may be understood in the art. In some embodiments, a client device may request digital information by sending one or more digital information requests to a content provider. In response to the digital information request, a content provider may optionally verify the authenticity of the request and/or the identity of the client device, e.g. using one or more verification protocols such as direct anonymous attestation, enhanced privacy ID, or the like.

In any case the method may proceed to block 203, wherein a client device may monitor for the receipt of a content transmission request (CTR) message from a content provider. As noted previously, a CTR may contain information that may be used by a policy enforcement module executed within an architectural enclave of a client device to determine which of a plurality of DRM protocols is to be implemented to protect digital information. Alternatively or additionally, a CTR may specify that a particular DRM protocol is to be implemented with respect to certain digital information. Accordingly, a CTR may include an identifier of the digital information to be transmitted, as well as information pertinent to DRM factors (e.g., which may be stored in a DRM selection policy, a DRM repository, etc.), and optionally an identifier of a specific DRM protocol to be used.

At block 204, a determination may be made as to whether a CTR has been received. If not, the method may loop back to block 203, whereupon a client device may continue to monitory for receipt of a CTR. Upon receipt of a CTR, the method may proceed to block 205, wherein a client device may analyze information in the CTR against DRM selection factors in one or more policies, such as a DRM selection policy, as discussed above. Consistent with the foregoing discussion, such analysis may be performed pursuant to the execution of a policy enforcement module with an architectural enclave hosted by the client device. From this analysis, a determination as to which of a plurality of DRM protocols will be implemented to protect the digital information that is to be received by the client device.

The method may then proceed to block 206, wherein a determination may be made as to whether a preexisting SIPE is hosted by the client device, and is configured to support the identified DRM protocol. As generally discussed above, this determination may be made pursuant to the execution of one or more modules (e.g., policy enforcement module, SIPE selection module, etc.) executed within an architectural enclave hosted by the client device.

If no suitable preexisting SIPE is present, the method may proceed to optional block 207, wherein an architectural enclave (and/or module executed therein) may query a content provider and/or other party to identify and/or provide the resource requirements that may be needed to implement the identified DRM protocol. As may be appreciated, optional block 207 may be omitted where an architectural enclave is aware of the hardware and other requirements needed to implement the identified DRM protocol, and is in possession/control of such resources.

In any case the method may proceed to block 208, wherein an architectural enclave (or module executed therein) may generate or "spawn" a new SIPE on the client device, and new SIPE may be provisioned (by the architectural enclave or another entity) with the resources needed to implement the identified DRM protocol. For example, the architectural enclave may partition processing and memory resources on the client to a new SIPE. The architectural enclave may then provision the new SIPE with secrets (e.g., keys, etc.) and other resources (modules, software, etc.) that may be needed to implement the identified DRM protocol within the new SIPE.

Once the new SIPE is created (or if a preexisting SIPE configured to support the identified DRM protocol is present on the client device), the method may proceed to block 209, wherein the architectural enclave may select the preexisting or new SIPE for use in processing digital information in accordance with the identified DRM protocol. Transmission of the digital information may then be directed to the selected SIPE, as generally described above.

The method may then proceed to block 210, wherein the client device may receive digital information, e.g., from a content provider or another source. More particularly, the digital information may be received into the SIPE that was selected pursuant to block 209. The method may then proceed to block 211, wherein the selected SIPE may process the digital information in accordance with the DRM protocol(s) it is configured to implement. As discussed previously, such processing may involve one or more of: decrypting digital information to obtain plaintext, demodulating the plaintext, decoding the plaintext, encoding or re-encoding the plaintext, modulating plaintext, sealing plaintext to the SIPE (e.g. by encrypting the plaintext with an SIPE sealing key (e.g., an enclave sealing key)), processing the digital information (as modulated, encoded, etc.), outputting the digital information for consumption on media HW of the client device (e.g., a display, speakers, etc.), combinations thereof, and the like. As may be appreciated, the manner in which a SIPE processes digital information may be specific to the DRM protocol that is being implemented, and thus the order, nature, and implementation of any of the above noted exemplary operations may vary from one DRM protocol to another and hence, from one SIPE to another.

Once the digital information is processed pursuant to block 211, the method may proceed to block 212 and end.

By way of example, Rights Object Acquisition Protocol is a suite of XML-based Digital Rights Management (DRM) security protocols which enables Open Mobile Alliance-conformant user devices to request and acquire viewing and/or editing rights, permissions, privileges and other attributes from a Rights Issuer. This protocol is been specified in the open mobile alliance (OMA) DRM Specification v2.0. In this context, content provider 102 or another third party may serve as a rights issuer in an OMA DRM model.

With the foregoing in mind, content provider 102 or a third party may establish a connection with client 101 (or more particularly, with device platform 104) using a rights object acquisition protocol (ROAP) in connection with a rights provisioning request. An agent (not illustrated) in 105 observes that a content transmission request (which may itself be in the form of a policy) is to be provisioned by content provider 102 or the third party. The agent may request that architectural enclave 108 (or, more particularly, PEM 109) service the request. Architectural enclave 108 may analyze content of the CTR/policy and determine that certain restraints are required by content provider 102 (or a third party) to protect digital information to be supplied. For example, PEM 109 may determine from the policy that constraints such as content class-A processing is required. At this point, architectural enclave 108 may determine whether a suitable preexisting SIPE exists on client 101 and, if not, may construct a suitable new SIPE provisioned with privilege "class-A". Another CTR/policy may result in selection/creation of a second SIPE with other privileges, e.g., for processing content "class-B" digital information. For the sake of illustration SIPE $111_1$ will be considered suitable for "class-A" and SIPE $111_n$ will be considered suitable for "class-B."

Assuming that content provider 102 is to provide the digital information, content provider 102 may open a second connection to client 101/device platform 104, and assert an OMA-DRM digital information stream protected using a 'class-A' specific key. PEM 109 within AE 108 may forward/proxy the connection to SIPE $111_1$ AE 108 forwards/proxies the connection to SIPE $111_1$ where digital information packets/frames may be decrypted using a class-A key, which was previously provisioned to SIPE $111_1$ by architectural enclave 108, content provider 102, or other entity.

The resulting plaintext packets/frames of the digital information may be reencrypted (e.g., pursuant to the execution of DRMEM $112_1$) to using class-A secure channel key(s) (e.g. a PAVP or IEEE1667 channel key(s)), and SIPE $111_1$ may then output the reencrypted packets/frames to compatible downstream media hardware (assuming the rest of policies 110 are satisfied).

While the foregoing discussion focuses on the implementation of multiple DRM protocols with a client device that receives digital information from content provider such as a recording medium, content server, etc., it should be understood that the technologies described herein may be applied in other contexts as well. For example, the technologies described herein may be used to implement a variety of DRM protocols to protect digital information that may be created by one or more sensors coupled to a client device. In this way, the sensors coupled to a client device may be considered comparable to a content provider, in that they provide digital information and/or data which may be compiled into digital information to client 101.

As will be described later with reference to FIGS. 3 and 4, the technologies described herein may employ an architectural enclave to determine which of a plurality of DRM protocols is to be implemented to protect digital information received from a sensor, and/or digital information which may be compiled from sensor data received from one or more sensors. Having determined which DRM protocol is to be implemented, the architectural enclave may select a preexisting secure information processing environment (SIPE) on the client device for implementing the identified DRM protocol, if a suitable preexisting SIPE exists on the client. If a suitable preexisting SIPE does not exist, the architectural enclave may generate or "spawn" a suitable new SIPE, as generally discussed above, and select the new SIPE to implement the identified DRM protocol to protect the digital information and/or sensor data received from one or more sensors. Digital information from the sensor(s) may then be transmitted to the selected SIPE, which may process it in accordance with an appropriate DRM protocol.

Figure 3:
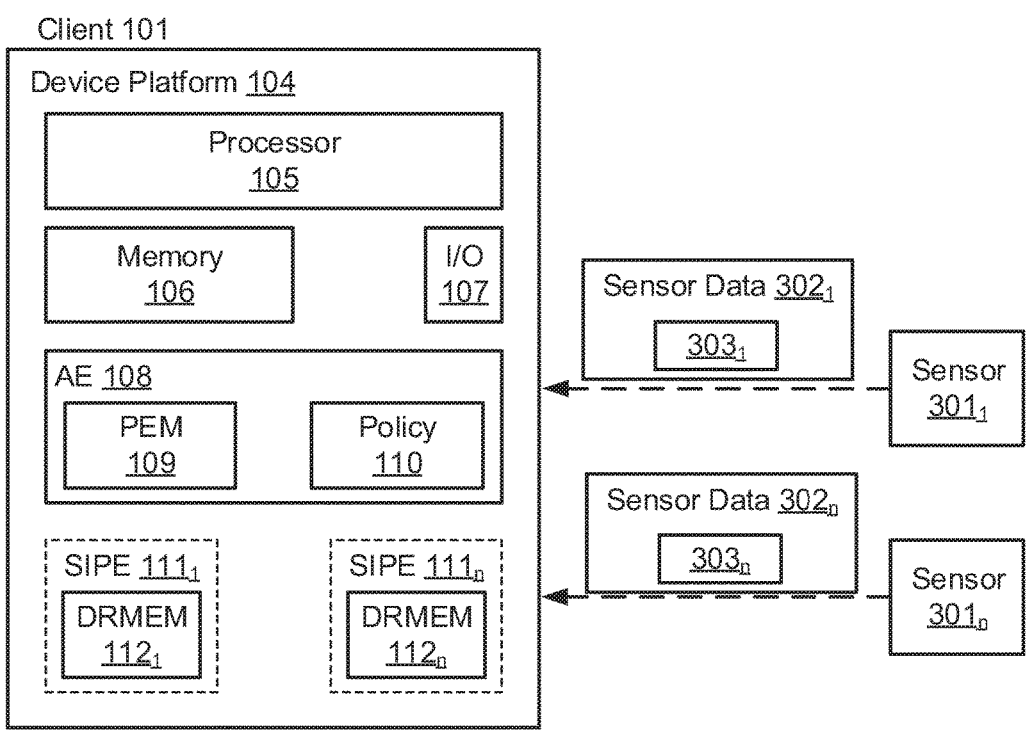
FIG. 3 depicts another exemplary system for supporting multiple digital rights management protocols, including another example of a client device consistent with the present disclosure.

Reference is now made to FIG. 3, which depicts an exemplary system for supporting multiple DRM protocols with another example of a client device consistent with the present disclosure. As shown, system 300 includes client 101, which is configured to include many of the same components as client 101 of FIG. 1. For the sake of brevity a detailed description of various components of client 101 and their functions is not provided again, except insofar as the components in FIG. 3 may differ in form and/or function with the components previously described in connection with FIG. 1

As further shown in FIG. 3, system 300 may include a plurality of sensors, such as sensor $301_1$ and Sensor $301_n$, where n is 0 or an integer greater than or equal to 2. FIG. 3 may therefore be understood as depicting a system wherein 1 or a plurality of sensors (e.g., 2, 3, 4, 5, 10, etc.). Sensors $301_1$, $301_n$ may be integral with, coupled to, or otherwise in communication with client 101, such that they may transmit one or more messages including sensor data ($302_1$, $302_n$) and/or other information such sensor data attributes $302_1$, $303_n$ to client 101.

Sensors $301_1$ and $301_n$ may be any sensor that may produce sensor data and provide such data to client 101, such as those mentioned above in connection with the description of FIG. 1. In some embodiments, Sensors $301_1$, $301_n$ may be one or more of an image sensor (e.g. a video camera or a still camera), an audio sensor (e.g., a microphone), a temperature sensor, a location (e.g., global positioning) sensor, a biometric sensor (e.g., fingerprint scanner, retinal scanner, deoxyribonucleic acid analyzer, facial recognition system, etc.), a chemical sensor, a radiation sensor, a range detection sensor, a pressure sensor, an input monitoring system (e.g., for monitoring one or more input/output devices), a network sensor, combinations thereof, and the like. Without limitation sensor $301_1$ is preferably a video sensor and sensor $301_n$ is preferably an audio sensor, e.g., as may be found in an audio visual recording system such as a video camera. In some embodiments, sensors $301_1$ and $301_n$ are both an audio visual recording system such as a video camera.

Any or all of the sensors in communication with client 101 may be associated with one or more sensor data attributes, which indicate the type, category, level, etc. of their respective sensor data. By way of example, it may be known that sensor $301_1$ records sensor data of a first security level (e.g., top secret) whereas sensor $301_n$ records sensor data of a second security level (e.g., unclassified). Similarly, sensor data from different sensors may be associated with different types of employees, businesses, different types of networks, different contextual information (e.g., relevant to where and/or how the sensor data is gathered, etc.). Sensor data attributes may in some embodiments include a DRM identifier, which identifies which DRM policy should be implemented to protect sensor data associated with the sensor data attributes. As will be described later, sensor data attributes may be used by one or more modules executed in an architectural enclave of a client device to determine which of a plurality of DRM protocols will be implemented to protect sensor data (or digital information compiled therefrom) received from one or more sensors.

Sensor data attributes may be conveyed to a client device in any suitable manner. For example, sensor data attributes may be transmitted to a client device with one or more sensor attribute messages, which may be conveyed via a suitable wireless or wired communication link between a sensor and a client device. Alternatively or additionally, sensor attributes may be appended as header and/or metadata that is/are associated with a transmission of sensor data to a client.

The above noted concepts are illustrated in FIG. 3, which depicts sensors $301_1$, $301_n$ as transmitting sensor data $302_1$ and $302_n$, respectively, to client 101. In this embodiment, sensor data $302_1$, $302_n$ each include sensor data attributes $303_1$, $303_n$, e.g., in the form of header data (e.g., where communication of sensor data $302_1$, $302_n$ is made via a packetized stream) and/or metadata, as previously described. Of course, sensor data attributes $303_1$, $303_n$ need not be communicated to client 101 in this manner Indeed, the present disclosure envisions embodiments wherein sensor data attributes $303_1$, $303_n$ are transmitted separately from sensor data $302_1$, $302_n$, e.g., in one or more sensor data attribute messages.

Figure 4:
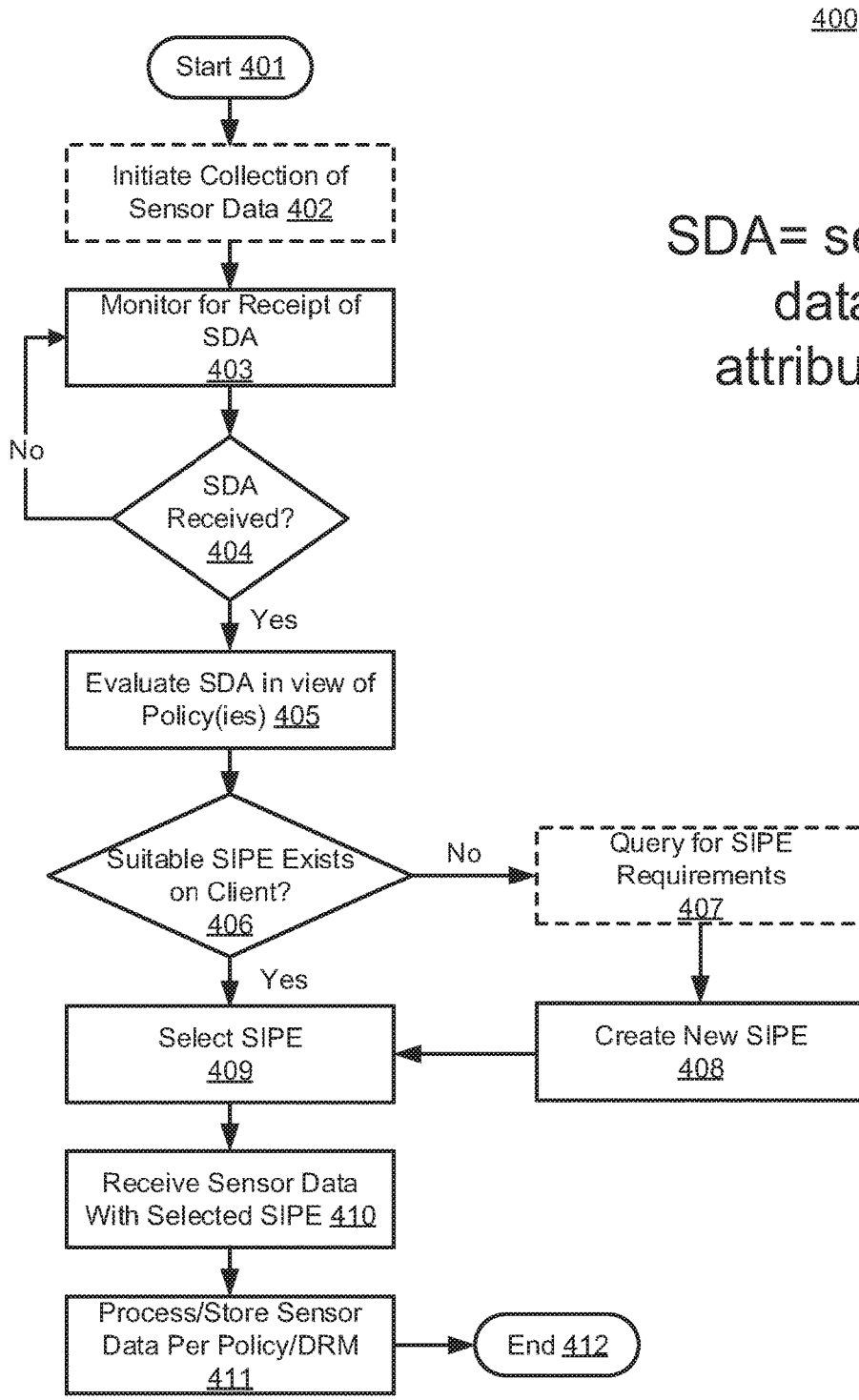
FIG. 4 is a flowchart of exemplary operations consistent an example method of supporting multiple digital rights management protocols consistent with the present disclosure, in a content creation use case.

Reference is now made to FIG. 4, which depicts exemplary operations that may be performed in connection with an example method of supporting multiple DRM protocols with a client device, such as client 101 of FIG. 3. As shown, method 400 begins at block 401. The method may then proceed to optional block 402, wherein a client device such as client 101 may optionally initiate gathering of sensor data, e.g., by sensors $301_1$, $301_n$. In some embodiments, a user of client 101 may initiate gathering of sensor data by making inputs to client 101, e.g., via a user interface provided thereon. Alternatively or additionally, initiation of sensor data gathering may be performed by an application executed on client 101.

In some embodiments, client device 101 may initiate sensor data gathering by sending one or more sensor data requests to a sensor, such as sensors $301_1$, $301_n$. In response to such request(s), the sensor(s) may optionally verify the authenticity of the request and/or the identity of the client device, e.g. using one or more verification protocols such as direct anonymous attestation, enhanced privacy ID, or the like. Such verification may be particularly useful in instances where one or more of sensors $301_1$, $301_n$ is a secured sensor, and/or forms part of a secured system.

In any case the method may proceed to block 403, wherein client device may monitor for the receipt of sensor data attributes from one or more sensors. For example, client 101 may monitor for the receipt of sensor data attributes messages from sensors $301_1$, $301n$, which may be in the form of separate messages and/or header/metadata associated with a transmission of sensor data. Like the information in a CTR discussed above with regard to FIG. 1, sensor data attributes messages may contain information that may be used by a policy enforcement module executed within an architectural enclave of a client device (e.g., architectural enclave 108) to determine which of a plurality of DRM protocols is to be implemented to protect sensor data provided by one or more sensors (e.g., sensors $301_1$, $301_n$) digital information. Alternatively or additionally, sensor data attributes may specify that a particular DRM protocol is to be implemented with respect to certain digital information as noted previously. Accordingly, sensor data attributes received from one or more sensors may include an identifier of the digital information to be transmitted, as well as information pertinent to DRM factors (e.g., which may be stored in a DRM selection policy, a DRM repository, etc.), and optionally an identifier of a specific DRM protocol to be used.

At block 404, a determination may be made as to whether sensor data attributes have been received. If not, the method may loop back to block 403, whereupon a client device may continue to monitor for receipt of such attributes. Upon receipt of sensor data attributes the method may proceed to block 205, wherein a client device (e.g., client 101) may analyze information in the sensor data attributes against DRM selection factors in one or more policies, such as a DRM selection policy maintained in policies 110. This analysis may be performed in substantially the same manner as discussed above with respect to the analysis of CTR information in the system of FIG. 1. Consistent with the foregoing discussion, such analysis may be performed pursuant to the execution of a policy enforcement module with an architectural enclave hosted by the client device, e.g., architectural enclave 108. From this analysis, a determination as to which of a plurality of DRM protocols will be implemented to protect sensor data (and/or digital information compiled therefrom) that will be received by the client device.

The method may then proceed to block 406, wherein a determination may be made as to whether a preexisting SIPE is hosted by the client device, and is configured to support the identified DRM protocol. Consistent with the discussion of FIGS. 1 and 2 above, this determination may be made pursuant to the execution of one or more modules (e.g., policy enforcement module 109, SIPE selection module, etc.) executed within an architectural enclave 108 hosted by client 101.

If no suitable preexisting SIPE is present, the method may proceed to optional block 407, wherein architectural enclave 108 (and/or module executed therein) of client 101 may query sensor(s) $301_1$, $301_n$ and/or another party to identify and/or provide the resource requirements that may be needed to implement the identified DRM protocol. As may be appreciated, optional block 407 may be omitted when architectural enclave 108 is aware of the hardware and other requirements needed to implement the identified DRM protocol, and is in possession/control of such resources.

In any case the method may proceed to block 408, wherein architectural enclave 108 (or module executed therein) may generate or "spawn" a new SIPE on client 101, and new SIPE may be provisioned (by architectural enclave 108 or another entity) with the resources needed to implement the identified DRM protocol. For example, architectural enclave 108 may partition processing and memory resources of client 101 to a new SIPE. It may then provision the new SIPE with secrets (e.g., keys, etc.) and other resources (modules, software, etc.) that may be needed to implement the identified DRM protocol within the new SIPE.

Once the new SIPE is created (or if a preexisting SIPE configured to support the identified DRM protocol is present on the client device), the method may proceed to block 209, wherein architectural enclave 108 (or a module executed thereon) may select the preexisting or new SIPE for use in processing sensor data in accordance with the identified DRM protocol. Transmission of sensor data $302_1$, $302_2$ may then be directed to the selected SIPE, as generally described above.

The method may then proceed to block 410, wherein client device 101 may receive sensor data $302_1$, $302_n$ from sensors $301_1$, $301_n$. More particularly, the sensor data may be received into the SIPE that was selected pursuant to block 309. The method may then proceed to block 311, wherein the selected SIPE may process the sensor data in accordance with the DRM protocol(s) it is configured to implement. Consistent with the foregoing discussion regarding the processing of digital information, the SIPE may process sensor data by performing one or more of the following: decrypting sensor data (e.g., when it is received in encrypted form) to obtain plaintext, demodulating the plaintext, decoding the plaintext, encoding the plaintext, modulating re-encoded plaintext, sealing plaintext to the SIPE (e.g. by encrypting the plaintext with an SIPE sealing key (e.g., an enclave sealing key)), processing the sensor data (as modulated, encoded, etc.), outputting the sensor data for consumption on media HW of the client device (e.g., a display, speakers, etc.), combinations thereof, and the like. As may be appreciated, the manner in which a SIPE processes sensor data may be specific to the DRM protocol that is being implemented, and thus the order, nature, and implementation of any of the above noted exemplary operations may vary from one DRM protocol to another and hence, from one SIPE to another.

Alternatively or in addition to the foregoing operations, an SIPE may execute sensor data compilation operations, which may compile sensor data from different sensors into digital information. For example, an SIPE may compile video data from sensor $201_1$ and audio data from sensor $201_n$ into digital information including both the audio and visual data. Processing operations may then proceed on the compiled digital information in substantially the same way as discussed previously.

Once the sensor data and/or digital information are processed pursuant to block 411, the method may proceed to block 412 and end.

By way of example, client 101 may establish a secure communications channel with one or more sensors, such as sensors $301_1$, $301_n$ using one or more channel encryption keys, as may be used in PAVP, IEEE 1667, or another protocol. Though that channel, client 101 may receive messages containing sensor data attributes ($303_1$, $303_n$), which may describe the attributes of sensor data $302_1$, $302_n$ to be provided by sensors $301_1$, $301_n$. An agent within processor 105 may observe the incoming transmission of sensor data attributes, and direct it to architectural enclave 108 for processing.

Sensor data attributes $303_1$ may specify that sensor data $302_1$ is "class-A" data, whereas sensor data $302_n$ is "class-B" data. PEM 109 may analyze the sensor data attributes and determine that relevant DRM protocols require constraints such as content class-A storage and processing, and content class B storage and processing. PEM 109 may then determine whether a preexisting SIPE is present on client 101 that can service the class-A or class B data in accordance with the identified DRM protocols. If not, PEM 109 may cause architectural enclave 108 to generate one or more new SIPEs on client 101 for servicing class-A and class-B sensor data.

Once a suitable SIPE has been selected/created, PEM 109 within architectural enclave may forward/proxy transmission of encrypted packets/frames of sensor data $111_1$ and $111_n$ to appropriate SIPEs, namely SIPE $111_1$ and SIPE $111_n$ for processing. Such transmission may occur over the same or a different connection as the transmission of sensor data attributes $302_1$, $302_n$. The SIPEs may decrypt the encrypted packets/frames to obtain their plaintext, e.g., using an appropriate decryption key which may have been previously provisioned to the SIPE. The SIPEs may then manipulate the plaintext as specified by the relevant DRM protocol, prior to storing it (e.g., sealing it to the relevant SIPE) or outputting it to another device.

As may be appreciated from the foregoing, the technologies of the present disclosure may harden the security of digital information, sensor data, etc. by maintaining that information and assets associated with a plurality of DRM protocols in one or more secure processing environments. Moreover, the technologies may leverage the flexible nature of the secure processing environments to support a wide variety of DRM protocols, e.g., by with one or more secure information processing environments (SIPEs). Because an SIPE may be flexibly provisioned with different hardware and non-hardware assets, it may perform many or all of the same functions of a hardware DRM module, but may avoid the drawbacks associated with the fixed resources and configurations of a hardware DRM module.

EXAMPLES

The following examples pertain to further embodiments. The following examples of the present disclosure may comprise subject material such as a system, a device, a method, a computer readable storage medium storing instructions that when executed cause a machine to perform acts based on the method, and/or means for performing acts based on the method, as provided below.

Example 1

According to this example there is provided a client device to support a plurality of digital rights management (DRM) protocols, including a processor, at least one architectural enclave, and at least one policy enforcement module (PEM) stored and executed within the architectural enclave, wherein the PEM is to: identify a first DRM protocol from a plurality of DRM protocols, wherein the first DRM protocol is to protect digital information received from at least one of a content provider and a sensor, select a preexisting secure information processing environment (SIPE) supporting the first DRM protocol for processing the first digital information, when a preexisting SIPE supporting the first DRM protocol exists on the client device; and create and select a new SIPE supporting the first DRM protocol on the client device for processing the first digital information, when a preexisting SIPE supporting the first DRM protocol does not exist on the client device.

Example 2

This example includes any or all of the elements of example 1, wherein the architectural enclave, the preexisting SIPE, and the new SIPE are each a memory enclave.

Example 3

This example includes any or all of the elements of any one of examples 1 to 3, wherein the client includes a plurality of preexisting secure information processing environments (SIPEs), wherein each of the SIPEs is configured to support a different one of the plurality of DRM protocols.

Example 4

This example includes any or all of the elements of any one of examples 1 to 3, wherein the client device further includes a digital rights management (DRM) repository in the architectural enclave, the DRM repository including a data structure associating at least a DRM identifier of the first DRM protocol with of requirements and resources needed to execute the first DRM protocol.

Example 5

This example includes any or all of the elements of example 4, wherein the PEM is further to determine whether the pre-existing SIPE supporting the first DRM protocol is present on the client device at least in part by: comparing the requirements associated with the DRM identifier correlating to the first DRM protocol to the configuration of each preexisting SIPE on the client device; and identifying a first preexisting SIPE as supporting the first DRM protocol if the configuration of the first preexisting SIPE meets the requirements associated with the DRM identifier correlating to the first DRM protocol.

Example 6

This example includes any or all of the elements of example 3, wherein the PEM is further to request resources needed to implement the first DRM protocol, when the resources are not present in the preexisting SIPE, new SIPE, or the DRM repository.

Example 7

This example includes any or all of the elements of any one of examples 1 to 6, wherein the digital information from the sensor includes sensor data.

Example 8

This example includes any or all of the elements of any one of examples 1 to 7, further including a plurality of preexisting secure information processing environments (SIPEs), wherein each of the preexisting SIPEs is configured to support a different one of the plurality of DRM protocols.

Example 9

This example includes any or all of the elements of any one of examples 1 to 8, further including a digital rights management enforcement module (DRMEM) to execute within at least one of the preexisting SIPE and the new SIPE, the DRMEM to perform digital rights management operations consistent with the first DRM protocol within the preexisting SIPE, the new SIPE, or a combination thereof.

Example 10

This example includes any or all of the elements of example 9, wherein the digital rights management operations comprise at least one of: decrypting the digital information, demodulating the digital information, decoding the digital information, encoding the digital information, encrypting the digital information, and combinations thereof.

Example 11

This example includes any or all of the elements of example 10, wherein the DRM operations comprise processing the digital information for secure video output.

Example 12

This example includes any or all of the elements of example 11, wherein processing the digital information for secure video output includes processing the digital information to comply with a protected audio video protocol.

Example 13

This example includes any or all of the elements of example 12, wherein the protected audio video protocol is selected from the group consisting of a high definition content protection (HDCP) protocol and a protected audio video path protocol.

Example 14

This example includes any or all of the elements of any one of examples 1 to 13, wherein the plurality of DRM protocols includes an advanced audio content system (AACS) protocol, a high definition content protection protocol, a digital transmission content protection (DTCP) protocol, a digital transmission content protection mapped to internet protocol (DTCP-IP), and combinations thereof.

Example 15

This example includes any or all of the elements of example 4, wherein the client is to receive the digital information from a content provider, and the PEM is further to: identify the first DRM protocol at least in part by comparing information in a content transmission request from the content provider to the DRM repository; direct transmission of the digital information from the content provider to the preexisting SIPE when a preexisting SIPE supporting the first DRM protocol is present on the client device; and direct transmission of the digital information from the content provider to the new SIPE, when a preexisting SIPE supporting the first DRM protocol is not present on the client device.

Example 16

This example includes any or all of the elements of example 15, wherein the content provider is a content server, a recording medium and combinations thereof.

Example 17

This example includes any or all of the elements of any one of examples 1 to 16, wherein the client is to receive the digital information from a sensor, and the PEM is to: identify the first DRM protocol at least in part by analyzing sensor data attributes received from the sensor; direct transmission of the digital information from the sensor to the preexisting SIPE when a preexisting SIPE supporting the first DRM protocol is present on the client device; and direct transmission of the digital information from the sensor to the new SIPE, when a preexisting SIPE supporting the first DRM protocol is not present on the client device.

Example 18

According to this example there is provided a method for supporting a plurality of digital rights management (DRM) protocols with a client device, the client device including an architectural enclave having a policy enforcement module stored and executed therein, wherein the method includes: identifying a first DRM protocol of the plurality of DRM protocols, the first DRM protocol to protect the digital information received by the client device from at least one of a content provider and a sensor; selecting a preexisting secure information processing environment (SIPE) supporting the first DRM protocol for processing the first digital information, when a preexisting SIPE supporting the first DRM protocol exists on the client device; and creating and selecting a new SIPE supporting the first DRM protocol on the client device for processing the first digital information, when a preexisting SIPE supporting the first DRM protocol does not exist on the client device.

Example 19

This example includes any or all of the elements of example 18, wherein the architectural enclave, the preexisting SIPE, and the new SIPE are each a memory enclave.

Example 20

This example includes any or all of the elements of any one of examples 18 and 19, wherein the client includes a plurality of preexisting secure information processing environments (SIPEs), wherein each of the SIPEs is configured to support a different one of the plurality of DRM protocols, and the method includes determining whether at least one of the preexisting SIPEs supports said first DRM protocol.

Example 21

This example includes any or all of the elements of any one of examples 18 to 20, wherein the client device further includes a digital rights management (DRM) repository in the architectural enclave, the DRM repository including a data structure associating at least a DRM identifier of the first DRM protocol with at least one of requirements and resources needed to execute the first DRM protocol, and the method further includes determining whether a pre-existing SIPE supporting the first DRM protocol is present on the client device at least in part by: comparing the requirements associated with the DRM identifier correlating to the first DRM protocol to the configuration of each preexisting SIPE on the client device; and identifying a first preexisting SIPE as supporting the first DRM protocol if the configuration of the first preexisting SIPE meets the requirements associated with the DRM identifier correlating to the first DRM protocol.

Example 22

This example includes any or all of the elements of example 21, further including: requesting resources needed to implement the first DRM protocol from the content provider, the sensor, a trusted third party, or combination thereof, when the resources are not present in the preexisting SIPE, new SIPE, or the DRM repository.

Example 23

This example includes any or all of the elements of any one of examples 18 to 22, wherein the digital information from the sensor includes sensor data.

Example 24

This example includes any or all of the elements of example 23, wherein said sensor data includes local context relevant to said client device.

Example 25

This example includes any or all of the elements of any one of examples 18 to 24, wherein the client device includes a plurality of preexisting secure information processing environments (SIPEs), wherein each of the preexisting SIPEs is configured to support a different one of the plurality of DRM protocols.

Example 26

This example includes any or all of the elements of any one of examples 18 to 25, further including a digital rights management enforcement module (DRMEM) to execute within at least one of the preexisting SIPE and the new SIPE, the method further including performing digital rights management operations consistent with the first DRM protocol at least in part with the DRMEM, and within the preexisting SIPE, the new SIPE, or a combination thereof.

Example 27

This example includes any or all of the elements of example 26, wherein the digital rights management operations comprise at least one of: decrypting the digital information, demodulating the digital information, decoding the digital information, encoding the digital information, encrypting the digital information, and combinations thereof.

Example 28

This example includes any or all of the elements of example 26, wherein the DRM operations comprise processing the digital information for secure video output.

Example 29

This example includes any or all of the elements of example 28, wherein processing the digital information for secure video output includes processing the digital information to comply with a protected audio video protocol.

Example 30

This example includes any or all of the elements of example 30, wherein the protected audio video protocol is selected from the group consisting of a high definition content protection (HDCP) protocol and a protected audio video path protocol.

Example 31

This example includes any or all of the elements of any one of examples 18 to 30, wherein the plurality of DRM protocols includes an advanced audio content system (AACS) protocol, a high definition content protection protocol, a digital transmission content protection (DTCP) protocol, a digital transmission content protection mapped to internet protocol (DTCP-IP), and combinations thereof.

Example 32

This example includes any or all of the elements of example 21, wherein the client is to receive the digital information from a content provider, and the method further includes: identifying the first DRM protocol at least in part by comparing information in a content transmission request from the content provider to the DRM repository; directing transmission of the digital information from the content provider to the preexisting SIPE when a preexisting SIPE supporting the first DRM protocol is present on the client device; and directing transmission of the digital information from the content provider to the new SIPE, when a preexisting SIPE supporting the first DRM protocol is not present on the client device.

Example 33

This example includes any or all of the elements of example 32, wherein the content provider is a content server, a recording medium and combinations thereof.

Example 34

This example includes any or all of the elements of any one of examples 18 to 33, wherein the client is to receive the digital information from a sensor, and the method further includes: identifying the first DRM protocol at least in part by analyzing sensor data attributes received from the sensor; directing transmission of the digital information from the sensor to the preexisting SIPE when a preexisting SIPE supporting the first DRM protocol is present on the client device; and directing transmission of the digital information from the sensor to the new SIPE, when a preexisting SIPE supporting the first DRM protocol is not present on the client device.

Example 35

According to this example there is provided at least one computer readable storage medium having instructions stored thereon for supporting a plurality of digital rights management (DRM) protocols with a client device, the client device including an architectural enclave, wherein the instructions when executed cause the client device to perform the following operations including: identify a first DRM protocol of the plurality of DRM protocols, the first DRM protocol to protect the digital information received by the client device from at least one of a content provider and a sensor; select a preexisting SIPE supporting the first DRM protocol for processing the first digital information, when a preexisting SIPE supporting the first DRM protocol exists on the client device; and create and select a new SIPE supporting the first DRM protocol on the client device for processing the first digital information, when a preexisting SIPE supporting the first DRM protocol does not exist on the client device.

Example 36

This example includes any or all of the elements of example 35, wherein the architectural enclave, the preexisting SIPE, and the new SIPE are each a memory enclave.

Example 37

This example includes any or all of the elements of any one of examples 35 and 36, wherein the client includes a plurality of preexisting secure information processing environments (SIPEs), wherein each of the SIPEs is configured to support a different one of the plurality of DRM protocols.

Example 38

This example includes any or all of the elements of any one of examples 35 to 37, wherein the client device further includes a digital rights management (DRM) repository in the architectural enclave, the DRM repository including a data structure associating at least a DRM identifier of the first DRM protocol with at least one of requirements and resources needed to execute the first DRM protocol, and the instructions when executed further cause the client device to determine whether a pre-existing SIPE supporting the first DRM protocol is present on the client device at least in part by: comparing the requirements associated with the DRM identifier correlating to the first DRM protocol to the configuration of each preexisting SIPE on the client device; and identifying a first preexisting SIPE as supporting the first DRM protocol if the configuration of the first preexisting SIPE meets the requirements associated with the DRM identifier correlating to the first DRM protocol

Example 39

This example includes any or all of the elements of example 38, wherein the instructions when executed further cause the client device to request resources needed to implement the first DRM protocol from the content provider, the sensor, a trusted third party, or combination thereof, when the resources are not present in the preexisting SIPE, new SIPE, or the DRM repository.

Example 40

This example includes any or all of the elements of any one of examples 35 to 39, wherein the digital information from the sensor includes sensor data.

Example 41

This example includes any or all of the elements of any one of examples 35 to 40, wherein the client device includes a plurality of preexisting secure information processing environments (SIPEs), wherein each of the preexisting SIPEs is configured to support a different one of the plurality of DRM protocols.

Example 42

This example includes any or all of the elements of any one of examples 35 to 41, wherein the instructions when executed further cause the client device to perform digital rights management operations consistent with the first DRM protocol within the preexisting SIPE, the new SIPE, or a combination thereof.

Example 43

This example includes any or all of the elements of example 42, wherein the digital rights management operations comprise at least one of: decrypting the digital information, demodulating the digital information, decoding the digital information, encoding the digital information, encrypting the digital information, and combinations thereof.

Example 44

This example includes any or all of the elements of example 42, wherein the DRM operations comprise processing the digital information for secure video output.

Example 45

This example includes any or all of the elements of example 44, wherein processing the digital information for secure video output includes processing the digital information to comply with a protected audio video protocol.

Example 46

This example includes any or all of the elements of example 45, wherein the protected audio video protocol is selected from the group consisting of a high definition content protection (HDCP) protocol and a protected audio video path protocol.

Example 47

This example includes any or all of the elements of any one of examples 35 to 46, wherein the plurality of DRM protocols includes an advanced audio content system (AACS) protocol, a high definition content protection protocol, a digital transmission content protection (DTCP) protocol, a digital transmission content protection mapped to internet protocol (DTCP-IP), and combinations thereof.

Example 48

This example includes any or all of the elements of example 38, wherein the client is to receive the digital information from a content provider, and the instructions when executed further cause the client device to perform the following operations including: identify the first DRM protocol at least in part by comparing information in a content transmission request from the content provider to the DRM repository; direct transmission of the digital information from the content provider to the preexisting SIPE when a preexisting SIPE supporting the first DRM protocol is present on the client device; and direct transmission of the digital information from the content provider to the new SIPE, when a preexisting SIPE supporting the first DRM protocol is not present on the client device.

Example 49

This example includes any or all of the elements of example 48, wherein the content provider is a content server, a recording medium and combinations thereof.

Example 50

This example includes any or all of the elements of any one of examples 35 to 49, wherein the client is to receive the digital information from a sensor provider, and the instructions when executed further cause the client device to perform the following operations including: identify the first DRM protocol at least in part by analyzing sensor data attributes received from the sensor; direct transmission of the digital information from the sensor to the preexisting SIPE when a preexisting SIPE supporting the first DRM protocol is present on the client device; and direct transmission of the digital information from the sensor to the new SIPE, when a preexisting SIPE supporting the first DRM protocol is not present on the client device.

Example 51

According to this example there is provided at least one computer readable medium including instructions which when executed by a client device cause the client device to perform a method in accordance with any one of examples 18-35.

Example 52

According to this example there is provided a client device including means to perform the method of any one of examples 18-35.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A client device to support a plurality of digital rights management (DRM) protocols, comprising:
    a processor;
    at least one architectural enclave;
    at least one DRM selection database stored within the architectural enclave, the DRM selection database to associate one or more of the plurality of DRM protocols with one or more corresponding DRM selection factors; and
    policy enforcement circuitry to:
        compare digital information to the DRM selection factors, the digital information received from at least one of a content provider and a sensor;
        identify a first DRM protocol from the plurality of DRM protocols based, at least in part, on a result of the comparison, wherein the first DRM protocol is to protect the received digital information; and
        select a secure information processing environment (SIPE) supporting the first DRM protocol for processing the digital information, wherein the selecting includes:
            determining whether a preexisting SIPE supporting the first DRM protocol exists on the client device;
            responsive to a determination that a preexisting SIPE supporting the first DRM protocol exists on the client device, selecting the preexisting SIPE supporting the first DRM protocol for processing the digital information; and
            responsive to a determination that a preexisting SIPE supporting the first DRM protocol does not exist on the client device:
                creating a new SIPE supporting the first DRM protocol on the client device; and
                selecting the new SIPE for processing the digital information.

2. The client device of claim 1, wherein the DRM selection factors include at least one of:
    a type of the digital information;
    a security level of the digital information;
    a security level of the client device; and
    a content tag.

3. The client device of claim 1, wherein the policy enforcement circuitry is further to verify a presence of a user.

4. The client device of claim 3, wherein the DRM selection factors include the presence of the user.

5. The client device of claim 1, further comprising a DRM repository stored in the architectural enclave, the DRM repository including a data structure associating at least a DRM identifier of the first DRM protocol with resources required to execute the first DRM protocol.

6. The client device of claim 1, wherein the determining a preexisting SIPE supporting the first DRM protocol exists on the client device comprises determining, based on at least the resources required to execute the first DRM protocol, whether a preexisting SIPE supporting the first DRM protocol exists on the client device.

7. The client device of claim 6, wherein the creating a new SIPE supporting the first DRM protocol on the client device comprises:
   requesting, based on the DRM repository, the resources required to execute the first DRM protocol; and
   creating a new SIPE supporting the first DRM protocol on the client device.

8. The client device of claim 5, wherein:
   the digital information is received from a content provider; and
   the profile enforcement circuitry is further to:
      identify the first DRM protocol at least in part by comparing information in a content transmission request from the content provider with the DRM repository; and
      direct transmission of the digital information from the content provider to the selected SIPE.

9. A method for supporting a plurality of digital rights management (DRM) protocols, the method comprising:
   receiving digital information from at least one of a content provider and a sensor;
   comparing the digital information to at least one of a plurality of DRM selection factors, the DRM selection factors associated with the plurality of DRM protocols;
   identifying a first DRM protocol from the plurality of DRM protocols based, at least in part, on a result of the comparison, wherein the first DRM protocol is to protect the received digital information; and
   selecting a secure information processing environment (SIPE) supporting the first DRM protocol for processing the digital information, wherein the selecting includes:
      determining whether a preexisting SIPE supporting the first DRM protocol exists on a client device;
      responsive to a determination that a preexisting SIPE supporting the first DRM protocol exists on the client device, selecting the preexisting SIPE supporting the first DRM protocol for processing the digital information; and
      responsive to a determination that a preexisting SIPE supporting the first DRM protocol does not exist on the client device:
         creating a new SIPE supporting the first DRM protocol on the client device; and
         selecting the new SIPE for processing the digital information.

10. The method of claim 9, wherein the DRM selection factors include at least one of:
   a type of the digital information;
   a security level of the digital information;
   a security level of the client device; and
   a content tag.

11. The method of claim 9, further comprising verifying a presence of a user.

12. The method of claim 10, wherein the DRM selection factors include the presence of the user.

13. The method of claim 9, further comprising determining resources required to execute the first DRM protocol;
   wherein the determining whether a preexisting SIPE supporting the first DRM protocol exists on the client device comprises determining, based at least on the resources required to execute the first DRM protocol, whether a preexisting SIPE supporting the first DRM protocol exists on the client device.

14. The method of claim 13, wherein the creating a new SIPE supporting the first DRM protocol on the client device comprises:
   requesting, based at least one the determined required resources, the resources required to execute the first DRM protocol; and
   creating a new SIPE supporting the first DRM protocol on the client device.

15. At least one non-transitory computer-readable storage medium having instructions stored thereon which, when executed by at least one processor, cause the at least one processor to perform operations for supporting a plurality of digital rights management (DRM) protocols, the operations comprising:
   receive digital information from at least one of a content provider and a sensor;
   compare the digital information to at least one of a plurality of DRM selection factors, the DRM selection factors associated with the plurality of DRM protocols;
   identify a first DRM protocol from the plurality of DRM protocols based, at least in part, on a result of the comparison, wherein the first DRM protocol is to protect the received digital information; and
   select a secure information processing environment (SIPE) supporting the first DRM protocol for processing the digital information, wherein the selecting includes:
      determining whether a preexisting SIPE supporting the first DRM protocol exists on a client device;
      responsive to a determination that a preexisting SIPE supporting the first DRM protocol exists on the client device, selecting the preexisting SIPE supporting the first DRM protocol for processing the digital information; and
      responsive to a determination that a preexisting SIPE supporting the first DRM protocol does not exist on the client device:
         creating a new SIPE supporting the first DRM protocol on the client device; and
         selecting the new SIPE for processing the digital information.

16. The at least one non-transitory computer-readable storage medium of claim 15, wherein the instructions, when executed by the at least one processor, cause the at least one processor to perform additional operations comprising:
   verify a presence of a user.

17. The at least one non-transitory computer-readable storage medium of claim 15, wherein the instructions, when executed by the at least one processor, cause the at least one processor to perform additional operations comprising:
   determine resources required to execute the first DRM protocol.

18. The at least one non-transitory computer-readable storage medium of claim 17, wherein the instructions resulting in determining whether a preexisting SIPE supporting the first DRM protocol exists on the client device, when executed by the at least one processor, cause the at least one processor to perform operations comprising:
   determining, based at least on the determined resources required to execute the first DRM protocol, whether a preexisting SIPE supporting the first DRM protocol exists on the client device.

19. The at least one non-transitory computer-readable storage medium of claim 17, wherein the instructions resulting in creating a new SIPE supporting the first DRM protocol on the client device, when executed by the at least one processor, cause the at least one processor to perform operations comprising:
   requesting the resources required to execute the first DRM protocol; and creating a new SIPE supporting the first DRM protocol on the client device.

20. The at least one non-transitory computer-readable storage medium of claim 19, wherein the content provider is a content server, a recording medium or a combination thereof.

* * * * *